(12) United States Patent
Mindrum

(10) Patent No.: US 7,222,120 B1
(45) Date of Patent: May 22, 2007

(54) METHODS OF PROVIDING A REGISTRY SERVICE AND A REGISTRY SERVICE

(75) Inventor: G. Scott Mindrum, Cincinnati, OH (US)

(73) Assignee: Making Everlasting Memories, L.L.C., Cincinnati, OH (US)

( * ) Notice: Subject to any disclaimer, the term of this patent is extended or adjusted under 35 U.S.C. 154(b) by 108 days.

(21) Appl. No.: 09/829,863

(22) Filed: Apr. 10, 2001

Related U.S. Application Data

(60) Provisional application No. 60/196,393, filed on Apr. 12, 2000.

(51) Int. Cl.
G06F 17/30 (2006.01)

(52) U.S. Cl. .................. 707/10; 707/3; 707/9; 707/102

(58) Field of Classification Search ............... 707/9, 707/3, 102, 10, 1; 705/14, 26, 1, 4, 8, 9, 705/11, 36; 52/102, 103
See application file for complete search history.

(56) References Cited

U.S. PATENT DOCUMENTS

| | | | |
|---|---|---|---|
| 3,928,928 A | 12/1975 | Kalust | |
| 4,169,970 A | 10/1979 | Opiela et al. | |
| 4,304,076 A | 12/1981 | Splendora | |
| 5,249,294 A | 9/1993 | Griffin, III et al. | |
| 5,278,662 A | 1/1994 | Womach et al. | |
| 5,307,456 A | 4/1994 | MacKay | |
| 5,404,343 A | 4/1995 | Boggio | |
| 5,459,819 A | 10/1995 | Watkins et al. | |
| 5,526,480 A | 6/1996 | Gibson | |
| 5,569,880 A | 10/1996 | Galvagni et al. | |
| 5,604,855 A | 2/1997 | Crawford | |
| 5,615,937 A | 4/1997 | Bellanger | |
| 5,629,980 A | 5/1997 | Stefik et al. | |
| 5,651,117 A | 7/1997 | Arbuckle | |
| 5,659,732 A * | 8/1997 | Kirsch ........................ | 707/5 |

(Continued)

FOREIGN PATENT DOCUMENTS

KR 1998-071672 10/1998

OTHER PUBLICATIONS

Legacy.com, 1999 (pp. 1-4).*

(Continued)

*Primary Examiner*—Cam-Y Truong
(74) *Attorney, Agent, or Firm*—Frost Brown Todd LLC

(57) ABSTRACT

Methods of providing a registry service and a registry service are provided. A remote storage location houses information regarding an entity or an event, and from time to time the remote storage location receives information regarding the entity or the event. Further, a string associated with a good identifies the storage location, whereupon remote access to the storage location may be achieved, if a proper access level is present.

Moreover, a registry service includes an identifying string located on a good along with a tag that uniquely identifies an entity or an event. The service controls storage, which is logically segmented and associated with the tag, and an access set of executable instructions is operable to provide remote access to the logically segmented storage using identifying information to determine the tag. Information regarding the entity and event may also be warehoused such that specific data regarding the entity or event is retrievable remotely upon a request.

21 Claims, 3 Drawing Sheets

U.S. PATENT DOCUMENTS

| | | | |
|---|---|---|---|
| 5,666,215 A | 9/1997 | Fredlund et al. | |
| 5,680,639 A | 10/1997 | Milne et al. | |
| 5,696,488 A | 12/1997 | Assisi | |
| 5,717,869 A | 2/1998 | Moran et al. | |
| 5,729,741 A | 3/1998 | Liaguno et al. | |
| 5,729,921 A | 3/1998 | Rojas | |
| 5,732,231 A | 3/1998 | Evans, III | |
| 5,732,515 A | 3/1998 | Rodrigues et al. | |
| 5,760,767 A | 6/1998 | Shore et al. | |
| 5,761,684 A | 6/1998 | Gibson | |
| 5,798,759 A | 8/1998 | Dahl | |
| 5,799,318 A | 8/1998 | Cardinal et al. | |
| 5,828,904 A | 10/1998 | Batson et al. | |
| 5,831,747 A | 11/1998 | Salgado | |
| 5,832,283 A | 11/1998 | Chou et al. | |
| 5,903,664 A | 5/1999 | Hartley et al. | |
| 5,930,810 A | 7/1999 | Farros et al. | |
| 5,960,429 A * | 9/1999 | Peercy et al. | 707/5 |
| 5,983,200 A | 11/1999 | Slotznick | |
| 6,003,032 A * | 12/1999 | Bunney et al. | 707/10 |
| 6,064,979 A * | 5/2000 | Perkowski | 705/6 |
| 6,065,002 A | 5/2000 | Knotts et al. | |
| 6,144,988 A * | 11/2000 | Kappel | 709/202 |
| 6,208,995 B1 * | 3/2001 | Himmel et al. | 707/104 |
| 6,264,032 B1 * | 7/2001 | Hobbs | 206/449 |
| 6,340,978 B1 * | 1/2002 | Mindrum | 345/764 |
| 6,414,663 B1 * | 7/2002 | Manross, Jr. | 345/87 |
| 6,487,538 B1 * | 11/2002 | Gupta et al. | 705/14 |
| 6,542,933 B1 * | 4/2003 | Durst et al. | 709/229 |
| 2002/0072925 A1 * | 6/2002 | Krim | 705/1 |
| 2003/0197721 A1 | 10/2003 | Mindrum et al. | |

OTHER PUBLICATIONS

Arlington National Cemetery, 1999, pp. 1-7.*
Leif Technologies, Inc., World Wide Web page; View.cndot.logy.TM,Memorials That Tell a Story, Copyright 1997.
Funeral Monitor, Jan. 20, 1997, vol. 6, No. 3.
The Grateful Dead Can Tell Their Story: Just Click a Mouse, Elizabeth Seay, Wall Street journal Mar. 16, 1998.
Screen shots from www.memories-by-design.com web site.
Screen shots from www.shockwave.com/sw/content/photojam web site.
Screen shots from PhotoJam 3 software.
Office Action dated Oct. 21, 2004 for U.S. Appl. No. 10/051,555, filed Jan. 17, 2002.
Office Action dated Apr. 18, 2005 for U.S. Appl. No. 10/051,555, filed Jan. 17, 2002.

* cited by examiner

METHODS OF PROVIDING A REGISTRY SERVICE AND A REGISTRY SERVICE

This application claims priority from U.S. Provisional 60/196,393 filed Apr. 12, 2000, the disclosure of which is incorporated herein by reference.

FIELD OF THE INVENTION

The present invention relates to methods of registering entities or events and recording and supplying information related thereto. Further, the present invention relates to a registry service for recording and supplying information related to registered entities or events.

BACKGROUND OF THE INVENTION

Information regarding entities and events are largely dispersed and included in a variety of media, such as electronic media, print media, and others. As a result, acquiring adequate information can be extremely unreliable and cumbersome to a individual desiring information about an entity or an event.

An entity may include, by way of example only, a person, an animal, an organization, a group, a landmark building/location, a historic device (e.g. space shuttle), a historic document (e.g. Declaration of Independence), and others. An event may include, by way of example only, a historic moment in time (e.g. American civil war), a personally significant moment in time to an individual (e.g., birth, wedding, death, and the like), a significant moment in time to an organization (e.g., date of first operation, information on the founders, leaders within the organization, and the like), a significant moment in time for a landmark or device (e.g., date first constructed), and others.

Typically, an individual seeking information about an entity or an event must do a substantial amount of research to acquire the information regarding the entity or the event. This research may entail, by way of example only, searching the Internet, searching the library, looking through family documents/memorabilia, and the like. Once done, the research may then be assembled into a cohesive package or centralized in one location by the individual. Often, the assembled research is provided as an additional document, which may or may not include electronic linkages to the information acquired during the research.

Moreover, the research regarding the entity or the event is often not directly located by additional individuals seeking to find information similar to the research performed. As a result, the research is repeated and, therefore, not effectively reusable. It would be more desirable for the research to be directly ascertainable from a good which is associated with the entity or the event.

In this way, additional individuals when presented with the good could locate the service associated with the good, such as and by way of example only a domain address on the World Wide Web ("WWW"), wherein the domain address is associated with a hypertext link referred to as a Uniform Resource Location ("URL"). For example, a headstone (e.g., a good) may be sold to a deceased's (e.g., entity) loved one (e.g. user), so that the headstone identifies a service by a name appearing as a string on the headstone. The user may then submit information (e.g., date of birth, date of death, pictures/videos/audio pieces associated with the deceased, and the like), regarding the entity to the service for collection and distribution in a centralized location (e.g., website). The information may be collected in electronic or print format and placed in an electronic format for centralized storage and distribution.

At some later point in time, a family member or friend of the entity (e.g., the deceased) will notice on the good (e.g., the headstone) the string identifying the registration service and may then establish an Internet connection and use the string (e.g., as part of the URL) to visit the website of the service. Once at the website, additional information (e.g., last name of the deceased, date of death, date of birth, and the like) about the entity (e.g., deceased) may be entered to acquire the information associated with the entity from the website. In this way, a centralized location may be readily ascertainable and may further permit uniform and easy remote access to information about the entity.

As one skilled in the art will appreciate, the ability to identify from a good the name of a registry service having information related to an entity or an event would be of tremendous benefit. Moreover, as the service acquires name recognition it may be that individuals will visit the service without first determining if an entity or event is associated with the service. In this way, it is possible for the registration service itself to become a centralized data warehouse for information associated with an entity or an event.

Moreover, it may be that the service becomes readily discernable to individuals simply by a seal or other mark of distinction, such that a website location of the registration service is readily known to an individual upon seeing the seal or mark of distinction on a good. Seals or marks of distinction will indicate to individuals that information regarding an entity or event associated with the good may be obtained from a registration service.

It is apparent that methods of providing a service to gain access to information related to an entity or an event in a centralized location are needed, as well as an improved registry service which effectively provides the same.

SUMMARY OF THE INVENTION

Accordingly, it is one object of the present invention to provide methods of providing a registry service and to provide a registry service. Initially, a good is sold in connection with a string which identifies a service. Moreover, additional identifying information associated with an entity or an event is discernable from the good. The service may then be located and queried with the identifying information to obtain information relevant to the entity or the event.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods and a service are provided for storing and acquiring information associated with an entity or an event.

On aspect of the present invention, provides a method of registering an entity or an event with a service, comprising associating a remote storage location and a service with a string which is further associated with a good. Moreover, a unique identifier is received from a user and from time to time the user may send information identified by the unique identifier, wherein the unique identifier uniquely identifies the entity or the event. Further, remote access is granted to at least a portion of the information to a remote user, wherein the remote user acquired the identifying information from the good and has a sufficient access level to gain remote access.

In another aspect of the present invention, a registry service is provided comprising, a string identifying a service, wherein the string is acquired from a good. Also, a tag uniquely identifies an entity or an event, and a computer readable medium is associated and controlled by the service and logically segmented to house information associated with the tag. Furthermore, an access set of executable instructions is provided wherein the instructions are operable to receive and store the information on the computer readable medium and to provide remote access to at least a portion of the information upon a request. The request includes identifying information which is used by the access set of executable instructions to determine the tag.

In yet another aspect of the present invention, a method of warehousing and retrieving information associated with an entity or an event for a remote service is provided. A unique identifier is distributed to a subscriber and associated with logical storage. Moreover, from time to time data is received which is associated with the unique identifier and the corresponding data is warehoused. Further, specific data is retrieved upon a remote request, where the request includes identifying information which is used to determine the unique identifier.

Still other objects of the present invention will become apparent to those skilled in this art from the following description wherein there are shown and described exemplary embodiments of this invention, simply for purposes of illustration. As will be realized, the invention may take on other aspects and arrangements than those described in detail below without departing from scope of the invention, as defined by the claims.

BRIEF DESCRIPTION OF THE DRAWINGS

The accompanying drawings incorporated in and forming a part of the specification, illustrate several aspects of the present invention, and together with the description serve to explain the principals of the invention. In the drawings.

Reference will now be made in detail to various exemplary embodiments of the present invention, examples of which are illustrated in the accompanying drawings, wherein like numerals indicate the same elements throughout the views.

DETAILED DESCRIPTION

Figure 1:
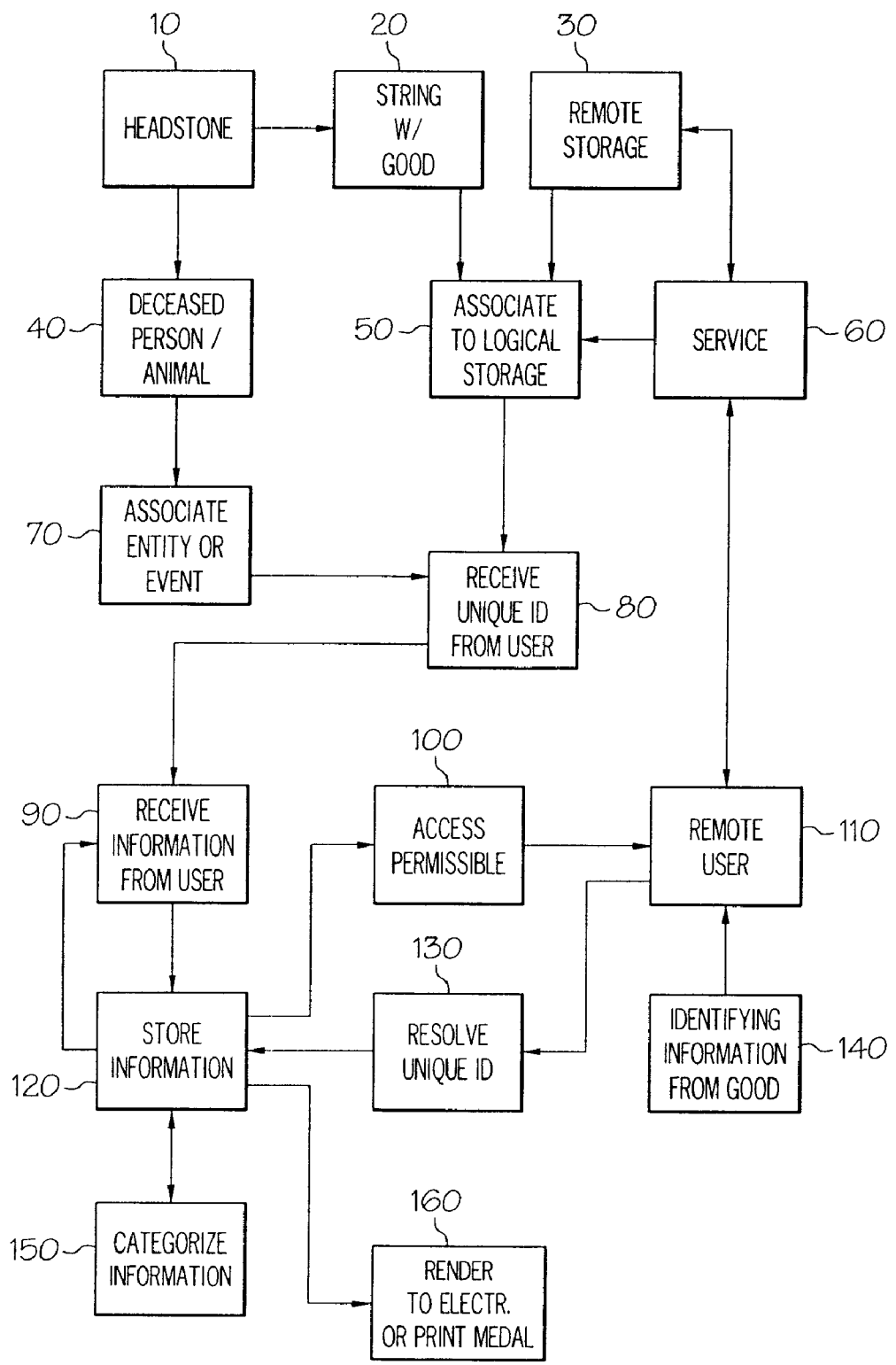
FIG. 1 is a flow diagram depicting a method of registering an entity or an event with a service.

The invention is disclosed in connection with the funeral business and implemented using Internet technologies such as World Wide Web ("WWW") browsers, scripting programming languages (e.g., Java, Active Server Pages, Perl, PHP, and others), standard relational databases (e.g., Oracle, SQL, and others), and data formatting languages (e.g., Extensible Markup Language ("XML"), Extensible Style Sheets Language ("XSL"), Hypertext Markup Language ("HTML"), and others).

Although as will be readily apparent to those skilled in the art, the present invention may be used in connection with any business using a variety of technologies, programming languages, data stores, or data format languages, now known or hereafter developed. Moreover, although a service is presented herein for purposes of illustration only in connection with the funeral business, it should be readily apparent that the methods and service provided herein may be used in connection with any business, such as and by way of example only, Life insurance, banking, trust service, law firms, genealogical services, affinity groups, housing, weddings, events (e.g. school remembrance), hospitals, publishing (e.g. magazines, web pages, and the like), pets, architectural landmarks, government agencies, and others.

As used herein a good includes any tangible object distributed by a business, person, or agency in connection with providing a product or a service. By way of example only, a service industry may provide a receipt in connection with a service, the receipt is a good. Moreover, a receipt may be a web page notification, an electronic email received in connection with a business transaction, or an oral confirmation number received via a telephone. Further, a good may include any and all tangible products received during a business transaction by a consumer or user.

Initially, a service is established where an individual or organization may submit information regarding an entity or an event. Information may be submitted in electronic or print media. Once received by the service the information is translated to an appropriate storage electronic format. Information may include, by way of example only, a cenotaph, photographs, videos, audio pieces, documents, drawings, factual data, biographical data, and any other information relevant or related to the entity or the event.

An initial subscription to the service may be acquired by automated sign-up and payment by an individual or an organization utilizing a browser with an Internet connection to the website of the service. Payment may be made with the initial subscription as well, by providing a bank or credit card number. The service may charge a monthly fee for warehousing the information regarding the entity or the event, and may further permit varying levels of security to different portions of the information provided by the individual or organization. Although as one skilled in the art will readily appreciate, initial subscription may occur through a variety of channels, such as via a phone conversation with a representative of the service, regular postal mail, and others. Moreover, payment need not occur at all, and may be made in a deferred manner and in a variety of readily apparent manners.

The service may provide electronic storage of information regarding the entity or the event. The information may be submitted to the service in an electronic format or in print media, if received in print media, the information may be scanned and stored electronically. Furthermore, as will be readily apparent to those skilled in the art, if the information is scanned and is associated with text, optical character recognition ("OCR") may be performed on the scanned image resulting in the information being stored in two electronic formats (e.g., image and text). The benefit of having text electronic data is obvious, since the text may be indexed and made available to a search engine for easy retrieval, or the text may be downloaded into an electronic editor and modified or incorporated into another body of text.

Moreover, the information may be stored on the service in a compressed electronic format and only decompressed when needed or desired. Further, different pieces of the information may have a security level associated therewith, such that some documents/images associated with the entity or event are viewable by users of the service while others are restricted to only authorized users of the service.

Further as will be apparent to one skilled in the art, additional WWW pages may be written on the website of the service, so as to provide an interface to the information and to permit other users (e.g., individuals other than the initial subscriber) to interface with the service and acquire some or all of the information related to the entity or the event. The service may also categorize and index and organize the information related to the entity or the event, such that access to specific data associated with the information may be acquired or retrieved by users in a variety or ways, such as searching, browsing a hierarchy, depressing a hypertext link, and others.

Once registration associated with the service is acquired, users with the appropriate access as granted by the initial subscriber may submit additional data regarding the entity or the event, all the data comprises the information which is to be associated with the entity or the event.

Additionally, users may acquire access to the service through a variety of channels such as wireless connections, direct connections, Internet connections, Plain Old Telephone ("POT") connections, and others. Also, users may establish connections using a variety of communication devices, such as phones, computers, hand held computing devices, digital phones, intelligent appliances, and the like.

Moreover, web pages associated with the Interface to the service may be voice enabled such that limited speech may be used to interact with the service. As one skilled in the art will appreciate, XML data format of the web pages combined with technology provided by organizations such as TellMe™ permit voice-to-text and text-to-voice interactions with the Internet. In this way, users may actually interface by voice with the electronic pages of the service.

Further, the service may provide upgrading options to the subscriber, such that automated applications will perform advanced web searching for information regarding the entity or the event and make the results centrally available to the users. For example, links may be mined from the Internet to provide links to genealogy sites, public record sites, news media sites, previous employer sites, and the like.

In FIG. 1 a flow diagram depicting one method of registering an entity or an event with a service is provided. Initially, a string is associated with a good in step 20, such as and by way of example only, a distinctive mark present on a headstone (step 10) of a deceased person or animal (step 40). The good will also have information which is associated with the entity or event (step 70). With the string, a user or a subscriber may identify a service and make a connection to the service for purposes of communicating with the service about the entity or the event.

Initially, the service may not have any data about a specific entity or event, however, once a subscription is established the service in step 60 associates electronic computer readable storage with the entity or the event in step 50. The storage may actually be remote from the service, as depicted in step 30, although as one skilled in the art will appreciate, the storage need not be remote from the service.

After a user acquires a subscription to the service, the user is provided a unique electronic identification (step 80) which identifies the service account associated with the entity or the service. Additionally, the subscribing user may also receive an account identification and password for purposes of identifying the subscribing user to the service upon logging onto the service. From time to time, the user may establish a communication with the service and submit data, which in total combines to form the information associated with the entity or the event in step 90. Once the data is received by the service it is stored in step 120 and may be optionally categorized or indexed in step 150. Further, as the user submits data, the data may be associated with a security or access level, such that data is only accessible by users identified by the user.

At some later point in time, a remote user, such as a interested family member or friend of a deceased entity establishes communications with the service in step 110. The remote user provides identifying information to the service in step 140. Optionally, the service may require the remote user to be registered with the service before providing any level of access, although as one skilled in the art will appreciate this is not necessary.

The service will then use the identifying information received from the remote user to resolve the unique identification (step 130) associated with the entity or event to which the remote user desires access. The identifying information, may, by way of example only, be a last name of an entity, a date of death of the entity, a name of event, and the like. An electronic search will obtain the appropriate information and display it back to the remote user based on the remote user's permissible access levels (step 100).

As will be apparent to those skilled in the art, standard web pages may provide the interface while displays back to the remote user the information about the entity or the event in a decompressed format and organized as appropriate for the remote user within the browser. Moreover, the remote user, the subscriber, or the service itself may request that parts of the information about the entity or the event be rendered to a variety of media, such as and by way of example only, print media (e.g., magazines), electronic media (e.g., emails, additional web pages, voice via a telephone, and the like), and others as depicted in step 160.

Figure 2:
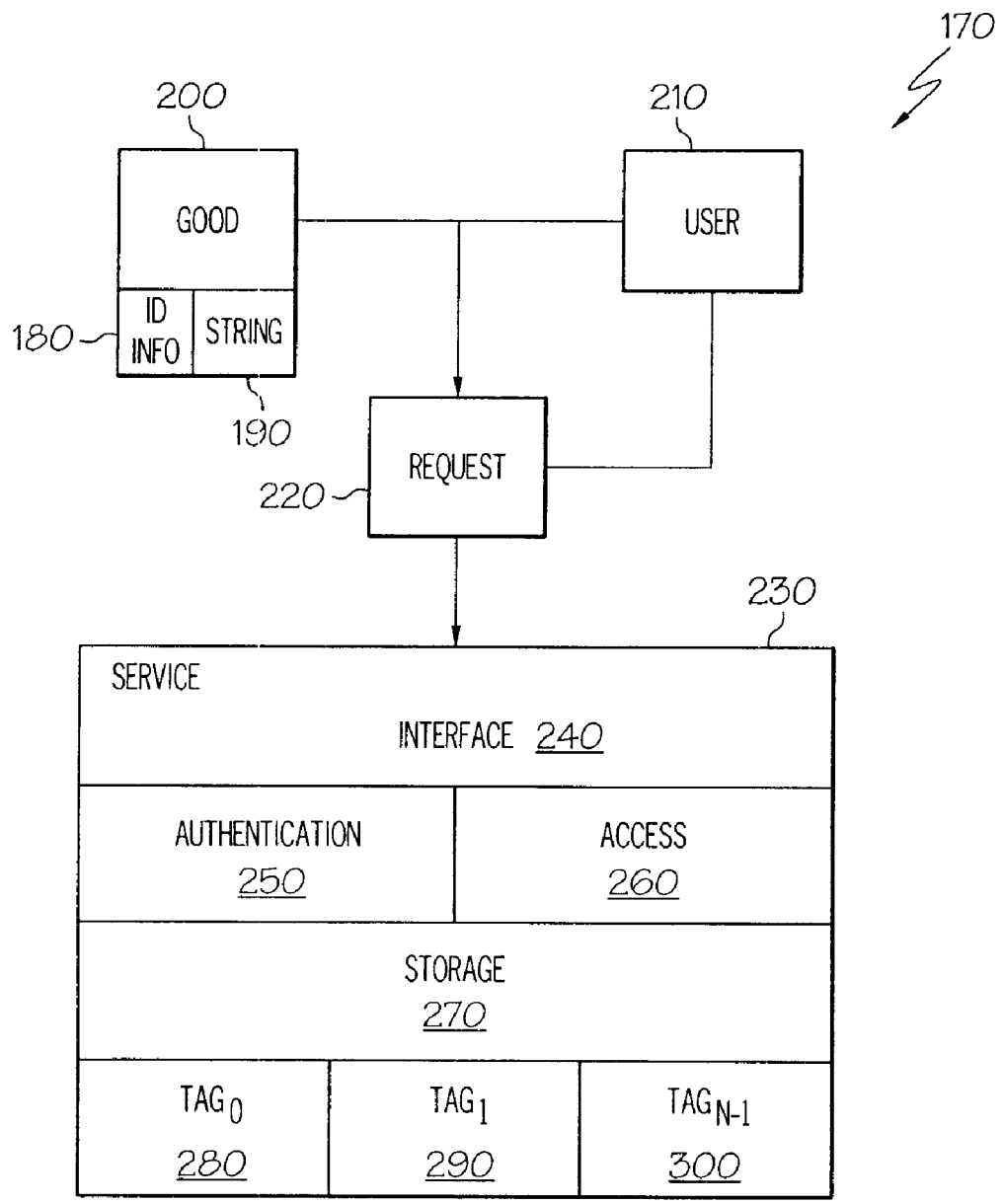
FIG. 2 is a schematic diagram depicting a registry service.

FIG. 2 depicts a schematic diagram depicting of one registry service of the present invention, wherein a service 230 includes an interface 240, an access set of executable instructions 260, an authentication set of executable instructions 250, computer readable media for storage 270, and one or more tags 280–300. Moreover, a request 220 issued from a user 210 includes identification information 180 and a string 190 acquired from a good 200.

The service 230 includes an interface 240 such as, and by way of example only, one or more web pages which are operable to communicate with the access set of executable instructions 260 and the authentication set of executable instructions 250. The interface 240 also receives a request 220 from an identified user 210. The user 210 may initially contact the service 230 and correspondingly the interface 240 by using the string 190 acquired from the good 200. For example, a distinctive mark on the good 200 may identify the URL of a website which the user 210 may type into a browser's address bar to obtain immediate contact with the service 230 and the interface 240, which will be the web pages residing at the website. Although as one skilled in the art will appreciate a variety of variations may exist to the above example all without departing from the present invention.

Furthermore, the user 210 constructs a request 220 once in communication with the service 230 and the interface 240, the request 220 includes identifying information 180 acquired from the good 200 by the user 210. Acquisition may be automatic, such as by way of example only, a bar code associated with the identifying information 180 or manual such as a last name associated with a deceased individual and located on a headstone. The interface 240 receives the request in step 220 and passes it to the access set of executable instructions 260, where a search is performed against the storage 270 to locate a unique tag 280–300 associated with an entity or an event.

The storage 270 will include electronic information associated with the entity or the event, and the information is logically associated with the appropriate unique tag 280–300. The interface 240 will be restricted, by an authentication set of executable instructions 250, from providing the appropriate information back to the interface 240 and correspondingly the user 210, if the initial request 220 received from the user 210 does not have an appropriate access level to view the information. Although as will be apparent to one skilled in the art, some of the information may be permissibly viewable by the user 210, in this way parts of the information may be viewed while other parts of the information may not be viewed by a user 210.

Figure 3:
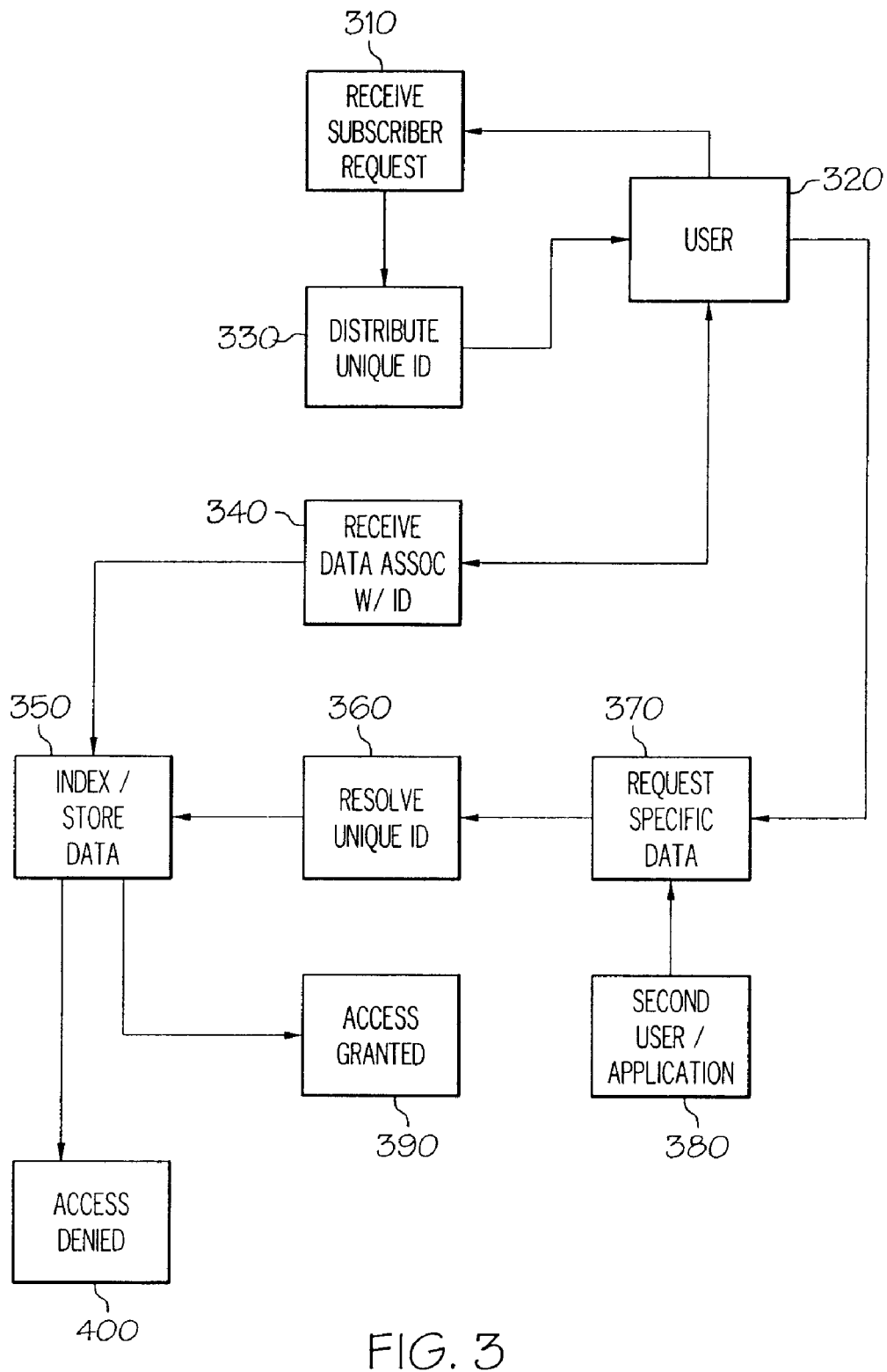
FIG. 3 is a flow diagram depicting a method of warehousing and retrieving information associated with an entity or an event.

FIG. 3 is a flow diagram depicting one method of warehousing and retrieving information associated with an entity or an event. Initially, a subscription request is received in step 310 from a user in step 320. After a successful subscription, a unique identification is distributed to the user in step 330, the unique identification being associated with an entity or an event to which the user's subscription applies. From time to time, the user may send data associated with the distributed identification in step 340.

The received data combined with the identification permits the data to be indexed and stored in step 350. At some later point in time, the same user or an additional user (step 380) may request specific data in step 370. The request will include identifying information which is used to resolve the identification in step 360 and search the stored data. If the user has the appropriate access, then access to the data is granted in step 390, otherwise access is denied in step 400.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A registry system for deceased persons, the registry system comprising:
    a computer;
    a concrete memorial for a deceased person, the concrete memorial comprising discernable information including a name of the deceased person;
    an on-line registry service accessible over the Internet, the on-line registry service comprising one or more web pages having information related to the deceased person;
    an identifier on or near the concrete memorial for the deceased person, the identifier indicating to people visiting the concrete memorial that the information related to the deceased person is available on the on-line registry service, wherein the identifier is different from the name of the deceased person.

2. The registry system of claim 1, wherein the concrete memorial is a headstone.

3. The registry system of claim 1, wherein the identifier is a string.

4. The registry system of claim 3, wherein the identifier is a URL.

5. The registry system of claim 1, wherein the identifier is a seal.

6. The registry system of claim 1, wherein the identifier is a mark.

7. The registry system of claim 1, wherein the concrete memorial is positioned in a cemetery.

8. The registry system of claim 1, being further adapted for use with deceased animals.

9. The registry system of claim 1, wherein the on-line registry service comprises information on a plurality of deceased persons.

10. The registry system of claim 9, wherein the on-line registry service can be searched based on at least part of the discernable information.

11. The registry system of claim 9, wherein the on-line registry service is operative to allow visitors to provide information related to a deceased person available on the on-line registry service.

12. The registry system of claim 1, wherein the registry service is a subscription service.

13. The registry system of claim 12, wherein the subscription service is a periodic fee-based subscription.

14. The registry system of claim 1, wherein the information on the one or more web pages comprises images and biographical data related to the deceased person.

15. A method for memorializing a deceased person, the deceased person having a physical memorial comprising at least a deceased person's name, the method comprising the steps of:
    establishing a subscription for an on-line registry service with a subscriber, the subscription being associated with the deceased person;
    visually indicating with an identifier, on or near the physical memorial for the deceased person, that the on-line registry service is associated with the deceased person, wherein the identifier is different from the deceased person's name;
    providing by subscriber information relating to the deceased person;
    storing the information relating to the deceased person on a computer system;
    providing to one or more visitors access over the Internet to the on-line registry service;
    retrieving the stored information relating to the deceased person; and
    displaying to the visitor or subscriber on one or more web pages at least a portion of the information relating to the deceased person.

16. The method of claim 15, further comprising the step of submitting by visitors information relating to the deceased person to the on-line registry service.

17. The method of claim 15, further comprising the step of collecting a subscription fee at least one time from the subscriber.

18. The method of claim 15, wherein a fee is collected on a periodic basis.

19. The method of claim 15, wherein the steps are performed sequentially.

20. The method of claim 19, wherein the steps are performed sequential as listed.

21. A registry system for deceased persons, the registry system comprising:
    a computer;
    a concrete memorial for a deceased person, the concrete memorial comprising discernable information including a name of the deceased person, wherein the concrete memorial is positioned in a cemetery;
an on-line registry service accessible over the Internet, the on-line registry service comprising one or more web pages having images and biographical data related to a plurality of deceased persons,
said plurality of deceased persons including said deceased person, wherein the on-line registry service can be searched based on at least part of the discernable information; and a seal on or near the concrete memorial for said deceased person, the seal indicating to people visiting the concrete memorial in the cemetery that biographical data related to said deceased person is available on the on-line registry service, wherein the seal is different from the name of the deceased person.

* * * * *

UNITED STATES PATENT AND TRADEMARK OFFICE
CERTIFICATE OF CORRECTION

| | |
|---|---|
| PATENT NO. | : 7,222,120 B1 |
| APPLICATION NO. | : 09/829863 |
| DATED | : May 22, 2007 |
| INVENTOR(S) | : Scott G. Mindrum |

It is certified that error appears in the above-identified patent and that said Letters Patent is hereby corrected as shown below:

Column 8, Claim 15, line 30, delete "least a deceased person's", and replace with, -- least the deceased person's--.

Signed and Sealed this

Twenty-fourth Day of July, 2007

JON W. DUDAS
*Director of the United States Patent and Trademark Office*